United States Patent [19]

Drobny et al.

[11] Patent Number: 5,015,870

[45] Date of Patent: May 14, 1991

[54] VOLTAGE SUPPLY CIRCUIT

[75] Inventors: Wolfgang Drobny, Besigheim; Bernhard Mattes, Sachsenheim; Werner Nitschke, Ditzingen; Peter Taufer, Renningen; Hugo Weller, Oberriexingen, all of Fed. Rep. of Germany

[73] Assignee: Robert Bosch GmbH, Stuttgart, Fed. Rep. of Germany

[21] Appl. No.: 389,349

[22] Filed: Aug. 3, 1989

[30] Foreign Application Priority Data

Aug. 26, 1988 [DE] Fed. Rep. of Germany ....... 3828990

[51] Int. Cl.$^5$ .............................................. H02J 9/00
[52] U.S. Cl. ........................................ 307/66; 307/75
[58] Field of Search .................... 307/10.1, 52, 64, 66, 307/75, 77, 85, 86, 87, 72

[56] References Cited

U.S. PATENT DOCUMENTS

| 4,354,118 | 10/1982 | Spencer | 307/66 |
| 4,528,459 | 7/1985 | Wiegel | 307/66 |
| 4,730,121 | 3/1988 | Lee et al. | 307/87 |

FOREIGN PATENT DOCUMENTS

| 1790095 | 1/1972 | Fed. Rep. of Germany . |
| 2617424 | 11/1977 | Fed. Rep. of Germany . |
| 2846799 | 5/1979 | Fed. Rep. of Germany . |
| 2521169 | 7/1979 | Fed. Rep. of Germany . |
| 3506487 | 9/1986 | Fed. Rep. of Germany . |

Primary Examiner—J. R. Scott
Assistant Examiner—Jeffery A. Gaffin
Attorney, Agent, or Firm—Kenyon & Kenyon

[57] ABSTRACT

A voltage supply circuit has an energy reserve, which is charged by a voltage transformer, and a comparator circuit, which controls switching circuit components. When the supply voltage is at its nominal value, a first switching circuit component is closed, with the result, that the energy reserve is operated in open circuit and is charged by the voltage transformer. When the supply voltage drops below a threshold, the comparator circuit opens the first switching circuit component and closes a second switching circuit component with the result that, at this point, the charged energy reserve is available for the voltage supply to the circuit configuration normally supplied with voltage from the supply voltage and the voltage transformer is disconnected from the supply voltage.

9 Claims, 2 Drawing Sheets

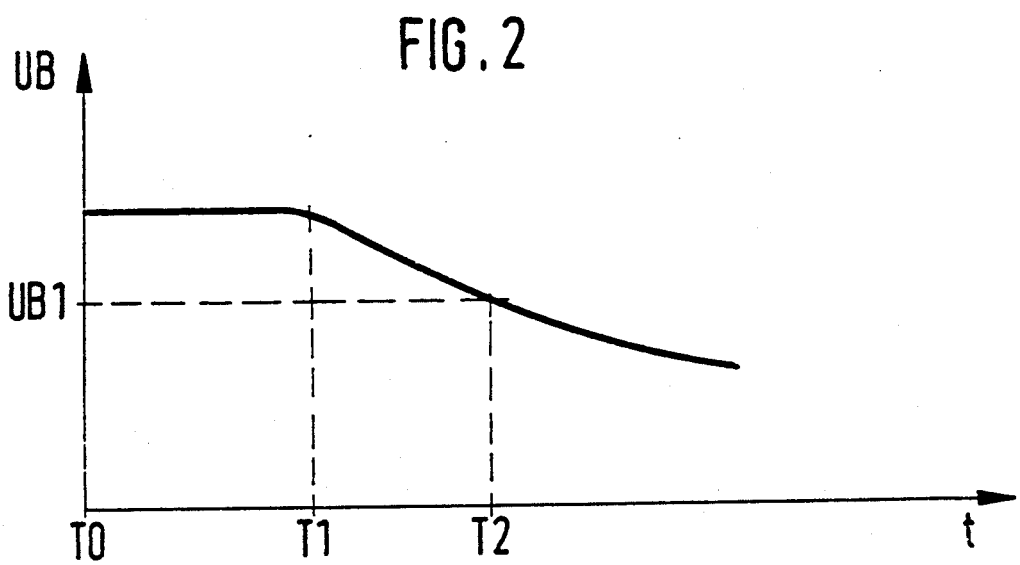
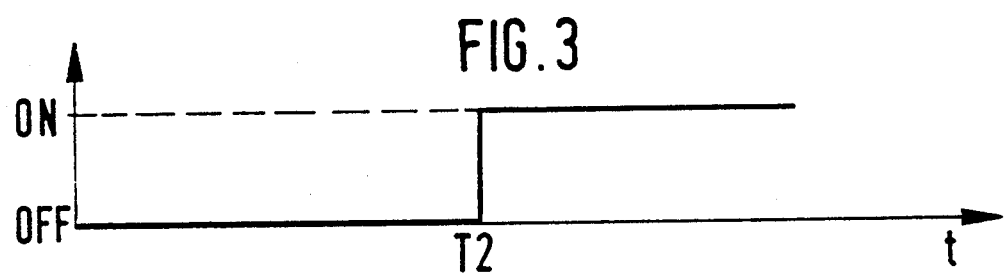
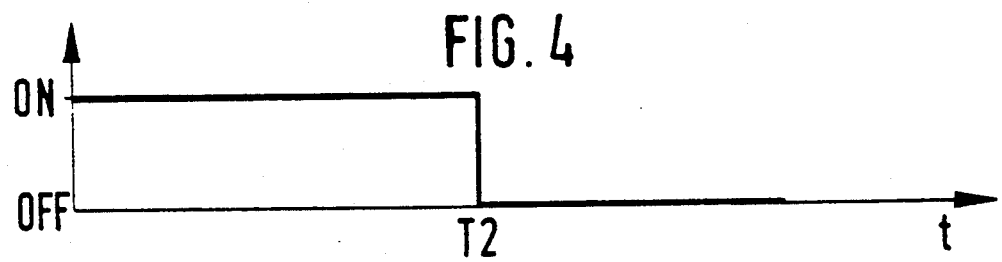
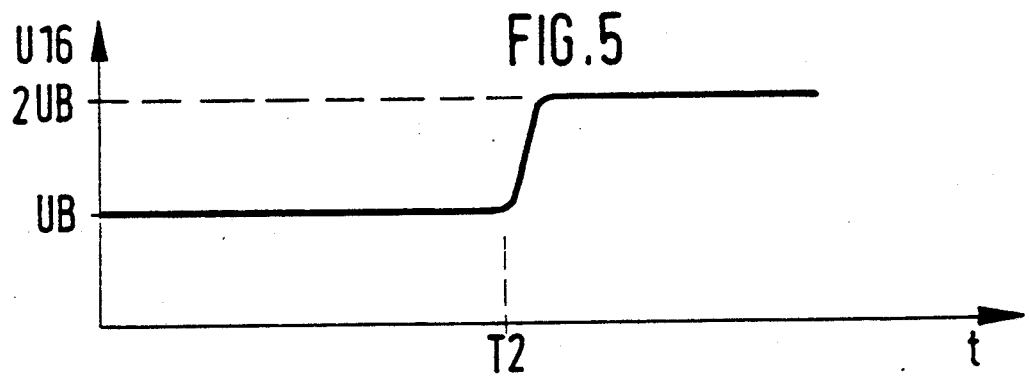

VOLTAGE SUPPLY CIRCUIT

BACKGROUND OF THE INVENTION

The present invention relates to voltage supply circuits, especially for vehicles.

A voltage supply circuit is known from German Printed Patent 35 06 487, whereby a changeover switch controlled by a threshold comparator connects a voltage transformer with the positive potential of a vehicle battery, only when its output voltage has fallen below a defined limiting value for voltage. Accordingly, in the case of this known voltage supply circuit, a vehicle battery, which has already fallen below its required voltage, must supply the energy to operate the voltage transformer and to effect the system transfer to voltage transformer operation.

Other references of which applicants are aware include the following:
DE OS 17 90 095;
DE OS 26 17424;
DE AS 25 21 169;
DE OS 28 46799.

SUMMARY OF THE INVENTION

In contrast, the advantage of the present invention is that, while the value of the circuit voltage is still high enough, i.e., the vehicle battery still has the required output voltage, an energy reserve from a voltage transformer is available, which is charged to a high enough required voltage. Also, when the supply voltage sinks below a minimal limiting value, all that is still needed from the circuit voltage supply is energy to connect the charged energy reserve to the energy-consuming parts of the electronic device.

Accordingly, it is an object of the present invention to provide a voltage supply circuit, particularly for vehicles, and even more particularly, such a voltage supply circuit which provides energy to an electrical device fed by a voltage supply source when the voltage supply source falls below a threshold value.

It is a further object to provide such a voltage supply circuit which stores electrical energy prior to the voltage supply source falling below a threshold value.

It is yet still a further object to provide such a voltage supply circuit which places minimal demands on the voltage supply source, especially when the voltage level of the source has fallen below a threshold value.

The objects of the present invention are achieved by a voltage supply circuit for an electrical device, the supply circuit having an energy reserve, a voltage transformer coupled to an input of the energy reserve, and a switching means, the switching means being actuated by a comparator circuit to connect the voltage transformer to a supply voltage in a first switching state, the energy reserve being chargeable by the voltage transformer in the first switching state, the switching means comprising a first switching means for connecting the voltage transformer to the supply voltage in the first switching state for the purpose of charging the energy reserve when the energy reserve is operating in open circuit in the first switching state, and a second switching means for connecting an output of the energy reserve to the electrical device in a second switching state, the first and second switching means being actuated by the comparator circuit such that when the supply voltage drops below a threshold, the first and second switching means are switched to the second switching state wherein the voltage transformer is disconnected from the supply voltage and the energy reserve is connected to the electrical device.

BRIEF DESCRIPTION OF THE DRAWINGS

The invention will be described in greater detail in the following detailed description with reference to the drawings, in which:

FIG. 2 is a diagram representing the circuit voltage as a function of time;

FIG. 3 is a diagram which clarifies the circuit state of a first circuit component as a function of time;

FIG. 4 is a diagram which explains the circuit state of a second circuit component as a function of time; and FIG. 5 is a diagram representing the voltage output characteristic of the supply circuit coupled to a circuit configuration which requires energy.

DETAILED DESCRIPTION

Figure 1:
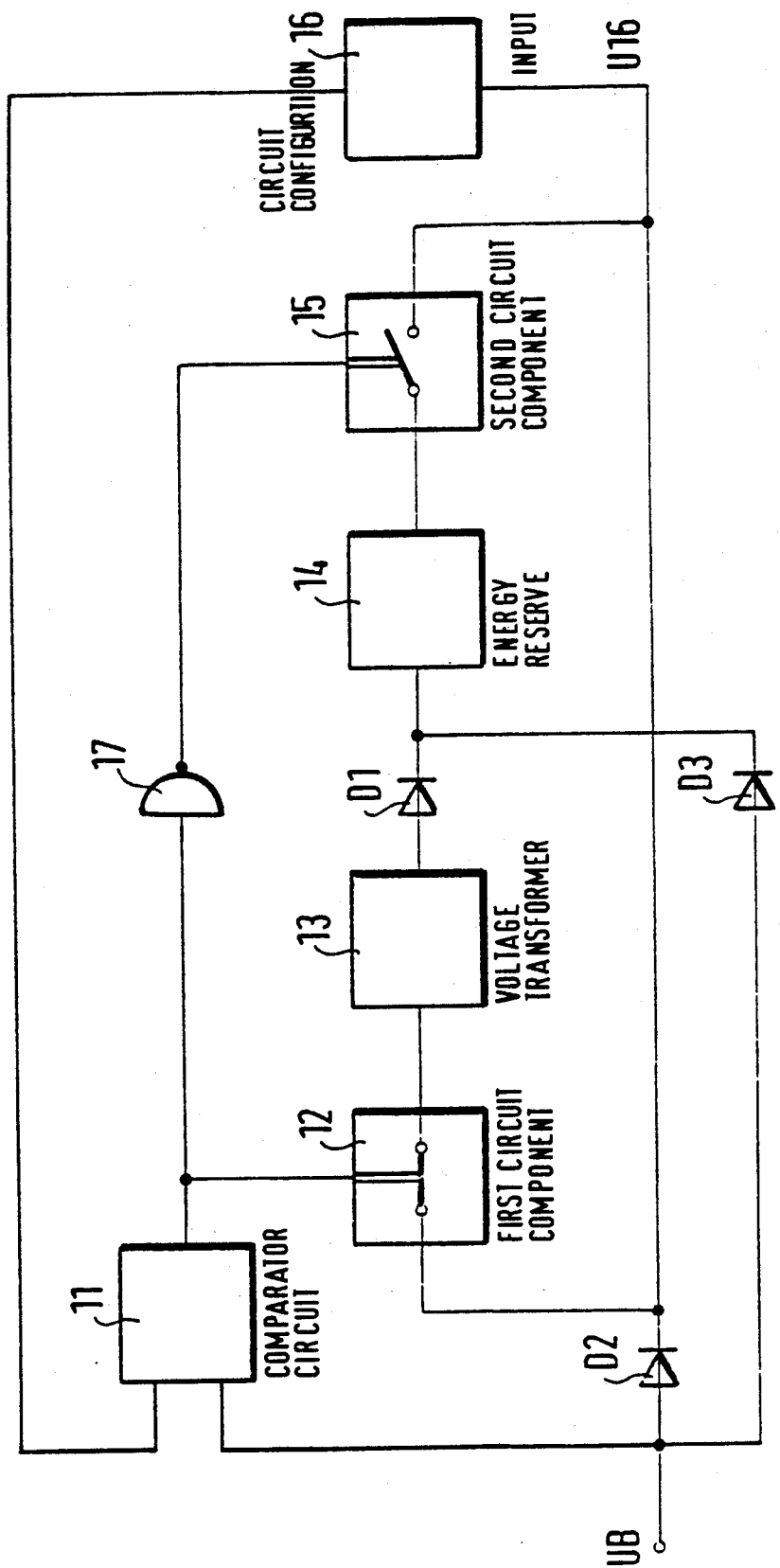
FIG. 1 is a block diagram of the voltage supply circuit according to the invention.

With reference now to the drawings, the voltage supply circuit according to the present invention serves to supply voltage to a circuit configuration 16, which comprises, for example, an acceleration-sensitive sensor, an evaluation circuit for the output signal of the sensor, and at least one firing circuit with a firing element to activate retention means for passengers in a vehicle, for example, air bags or belt tighteners.

The voltage supply circuit comprises a diode D2 polarized in the conducting direction, which is connected with its anode to the circuit voltage UB, and thus to the electrical system of the motor vehicle. Its cathode is connected to the input terminal of the circuit configuration 16, which is to be supplied with voltage. Further, the input terminal of a first circuit component 12, illustratively a switching circuit, is connected to the cathode terminal of the diode D2. The output terminal of this first circuit component is connected to the input terminal of a voltage transformer 13. The output terminal of the voltage transformer 13 is connected by a diode D1, polarized in the conducting direction, to the input terminal of an energy reserve 14. The energy reserve 14 is also connected by a diode D3 directly to the battery voltage UB and consequently can at least be charged continually to UB. This is a type of redundancy to the voltage transformer. Normally, however, the energy reserve 14 is charged by the higher voltage from the voltage transformer 13 output, and the diode D3 is back biased. Usually, a capacitor with relatively high capacitance is used as an energy reserve 14.

The output terminal of the energy reserve 14 is further connected to the input terminal of a second circuit component 15, illustratively a switching circuit, whose output terminal is connected to the input terminal of the circuit configuration 16.

A comparator circuit is designated with 11. Its output terminal is connected to the actuating terminal of the circuit component 12 and by an inverter 17 to the actuating terminal of circuit component 15. A first input terminal of the comparator circuit 11 is connected to the circuit voltage UB; a second input terminal of the comparator circuit 11 is connected to an output terminal of the circuit configuration 16.

The criterion to bring the energy reserve into circuit and to switch off the voltage transformer, in the case of the embodiment shown, is preferably the undershooting of a specific supply voltage threshold. However, an OR arrangement also fed with a tripping signal or the like may also be used.

The functioning of the voltage supply circuit is described in the following, with reference being also made to FIGS. 2 to 5. FIG. 2 illustrates the supply voltage UB as a function of time. As long as the supply voltage is sufficient, which is the case in the time period TO to T1 according to FIG. 2, the circuit components 12 and 15 are not actuated by the comparator circuit 11. Accordingly, the first circuit component 12 is in its closed switching position, while the second circuit component 15 is in an open switching position. These circuit states also are shown in the illustrations of FIGS. 3 and 4. In this operating state of the voltage supply circuit, the circuit voltage UB is connected to the input of the circuit configuration 16 via diode D2 and supplies this circuit configuration with voltage. At the same time, the voltage transformer 13 is connected by the closed circuit component 12 to the circuit voltage UB and, it converts the voltage UB into a voltage, which is suitable to charge the energy reserve 14. This converted voltage may be, for example, double the circuit voltage UB as shown in FIG. 5. Since the second circuit component 15 is open in this operating state, the energy reserve 14 is operated in open circuit and not brought on to load.

At the instant T1, according to FIG. 2, the circuit voltage UB begins to fall off and at the instant T2, it falls below a preselectable limiting value UB1. This voltage drop is determined by the comparator circuit 11, which is supplied with a stable reference voltage by the circuit configuration 16. As a result, the comparator circuit 11 actuates both circuit components 12 and 15, so that the first circuit component 12 assumes an open switching position and the second circuit component 15 assumes a closed switching position. Thereby, on the one hand, the voltage transformer 13 is disconnected by way of the first circuit component 12 from the circuit voltage UB. On the other hand, the energy reserve 14 is connected by the now closed second circuit component 15 to the circuit configuration 16, which is now supplied with a supply voltage U16 from the energy reserve. This switching over from the circuit voltage UB to the supply voltage U16, which amounts approximately to double the UB value, in the illustrated embodiment, is also shown in FIG. 5.

Since no load is brought on to the energy reserve 14 in the normal operating state, and the circuit configuration 16 is supplied by the circuit voltage UB, the voltage transformer only needs to supply a small amount of current, to sustain the energy reserve 14 at a sufficient state of charge. The result is that only relatively few and inexpensive components with insignificant space requirements can be used for the voltage transformer 13, since it only needs to supply a modest amount of power. At the same time, in the case of this voltage supply circuit, when the circuit voltage UB drops, a charged energy reserve 14 immediately becomes available, which, therefore, does not need to be charged first by an already reduced circuit voltage.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A voltage supply circuit for an electrical device, the supply circuit having an energy reserve, a voltage transformer coupled to an input of the energy reserve, and a switching means, the switching means being actuated by a comparator circuit to connect the voltage transformer to a supply voltage in a first switching state, the energy reserve being chargeable by the voltage transformer in the first switching state, the switching means comprising a first switching means for connecting the voltage transformer to the supply voltage in the first switching state for the purpose of charging the energy reserve when the energy reserve is operating in open circuit in the first switching state and a second switching means for connecting an output of the energy reserve to the electrical device in a second switching state, said first and second switching means being actuated by said comparator circuit such that when the supply voltage drops below a threshold, the first and second switching means are switched to the second switching state wherein the voltage transformer is disconnected from the supply voltage and the energy reserve is connected to the electrical device.

2. The supply circuit recited in claim 1, wherein the energy reserve is charged to about double the supply voltage by the voltage transformer.

3. The supply circuit recited in claim 2, wherein an output of the voltage transformer and the energy reserve input are coupled by a diode, which is polarized in the conducting direction.

4. The supply circuit recited in claim 2, wherein the energy reserve is also charged directly by the supply voltage by a diode, which is polarized in the conducting direction.

5. The supply circuit recited in claim 1, wherein an output of the voltage transformer and the energy reserve input are coupled by a diode, which is polarized in the conducting direction.

6. The supply circuit recited in claim 5, wherein the energy reserve is also charged directly by the supply voltage by a diode, which is polarized in the conducting direction.

7. The supply circuit recited in claim 1, wherein the energy reserve is also charged directly by the supply voltage by a diode, which is polarized in the conducting direction.

8. The supply circuit recited in claim 1, wherein the electrical device comprises a protective device for passengers in a vehicle.

9. The supply voltage recited in claim 1, further comprising a diode coupling the supply voltage to the first switching means and the electrical device.

* * * * *